United States Patent
Hethcock, Jr. et al.

(10) Patent No.: US 10,369,772 B2
(45) Date of Patent: Aug. 6, 2019

(54) METHOD OF MAKING CORE-STIFFENED STRUCTURE

(71) Applicant: TEXTRON INNOVATIONS INC., Providence, RI (US)

(72) Inventors: James D. Hethcock, Jr., Colleyville, TX (US); Kenneth E. Nunn, Jr., Colleyville, TX (US); Carl A. May, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/050,564

(22) Filed: Feb. 23, 2016

(65) Prior Publication Data

US 2016/0167333 A1    Jun. 16, 2016

Related U.S. Application Data

(62) Division of application No. 13/521,367, filed on Jul. 10, 2012, now Pat. No. 9,266,313.

(51) Int. Cl.
| | |
|---|---|
| *B32B 37/00* | (2006.01) |
| *B32B 37/14* | (2006.01) |
| *B32B 3/12* | (2006.01) |
| *B32B 7/12* | (2006.01) |
| *B32B 37/12* | (2006.01) |

(52) U.S. Cl.
CPC .............. *B32B 37/146* (2013.01); *B32B 3/12* (2013.01); *B32B 7/12* (2013.01); *B32B 37/12* (2013.01); *B32B 37/1284* (2013.01); *B32B 2605/18* (2013.01)

(58) Field of Classification Search
CPC ... B32B 37/146; B32B 3/12; B29C 66/72525; B29C 66/7254; B29C 70/086; B29D 24/005
See application file for complete search history.

(56) References Cited

U.S. PATENT DOCUMENTS

| | | | |
|---|---|---|---|
| 4,049,487 A | 9/1977 | Kunz | |
| 4,445,956 A * | 5/1984 | Freeman | B23Q 3/086 156/154 |

(Continued)

FOREIGN PATENT DOCUMENTS

JP    08258189 A    10/1996

OTHER PUBLICATIONS

Canadian Office Action in related Canadian patent application No. 2,786,533, 3 pages, dated Dec. 30, 2013.
Chinese Office Action in related Chinese patent application No. 201080063585.1, 11 pages, dated Dec. 25, 2013.
EP Office Action dated Apr. 25, 2014 issued from European Patent Office in corresponding App. No. 10845381.2.

(Continued)

*Primary Examiner* — John L Goff, II
(74) *Attorney, Agent, or Firm* — James E. Walton

(57) ABSTRACT

A method of making a core-stiffened structure includes the steps of providing a honeycomb core having an adhesive disposed on first and second surfaces thereof, providing a first skin and a second skin, and assembling the first skin, the second skin, and the honeycomb core to form the core-stiffened structure. The method further includes the steps of curing the core-stiffened structure and inhibiting at least one of the first skin and the second skin from protruding into at least one cell of the honeycomb core during the step of curing the core-stiffened structure.

1 Claim, 9 Drawing Sheets

(56) References Cited

U.S. PATENT DOCUMENTS

| | | | |
|---|---|---|---|
| 4,680,216 A * | 7/1987 | Jacaruso | B29D 24/005 |
| | | | 428/116 |
| 5,128,192 A | 7/1992 | Narasaki | |
| 5,876,931 A | 3/1999 | Rawal | |
| 5,897,739 A | 4/1999 | Forster et al. | |
| 6,261,675 B1 * | 7/2001 | Hsiao | B29C 70/22 |
| | | | 428/219 |
| 7,311,960 B2 * | 12/2007 | Lucas | B32B 3/12 |
| | | | 428/116 |
| 9,266,313 B2 | 2/2016 | Hethcock, Jr. et al. | |
| 2005/0126699 A1 * | 6/2005 | Yen | B29C 70/088 |
| | | | 156/285 |
| 2005/0161154 A1 | 7/2005 | Anderson | |
| 2006/0172111 A1 | 8/2006 | Polus | |
| 2007/0184240 A1 | 8/2007 | Ichikawa | |
| 2008/0093073 A1 | 4/2008 | Bustos | |
| 2008/0178992 A1 | 7/2008 | Pillai | |
| 2009/0155524 A1 * | 6/2009 | Rapp | B29C 70/086 |
| | | | 428/116 |
| 2011/0151183 A1 * | 6/2011 | Reller | B32B 7/12 |
| | | | 428/134 |

OTHER PUBLICATIONS

Office Action dated Aug. 6, 2014 from counterpart CA App. No. 2,786,533.
Office Action dated Sep. 4, 2014 from counterpart CN App. No. 201080063585.1.
Office Action dated Mar. 3, 2015 from counterpart EP App. No. 10845381.2.
Office Action dated Apr. 9, 2015 from counterpart CA App. No. 2,786,533.
Office Action dated Mar. 19, 2015 from counterpart CN App. No. 201080063585.1.
International Search Report and the Written Opinion of the International Searching Authority mailed by ISA/USA, U.S. Patent and Trademark Office dated Apr. 12, 2010 for International Patent Application No. PCT/US10/23357, 10 pages.
Office Action from U.S. Appl. No. 13/521,367 dated Apr. 20, 2015.
Issue Notice from U.S. Appl. No. 13/521,367 dated Feb. 4, 2016.
Indian Office Action in related Indian patent application No. 6468/DELNP/2012, dated Sep. 28, 2017.

* cited by examiner

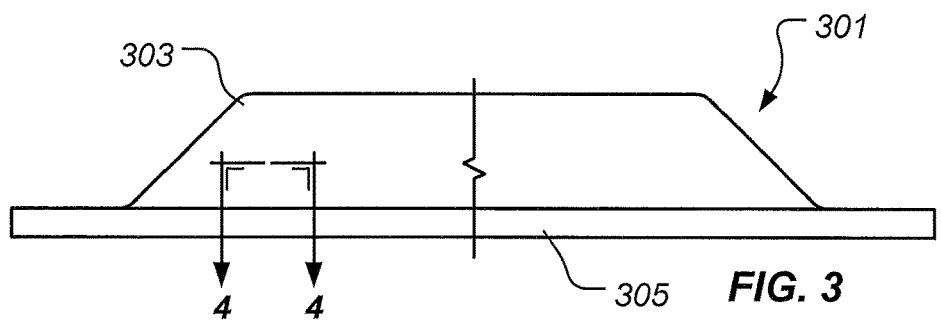
*FIG. 3*
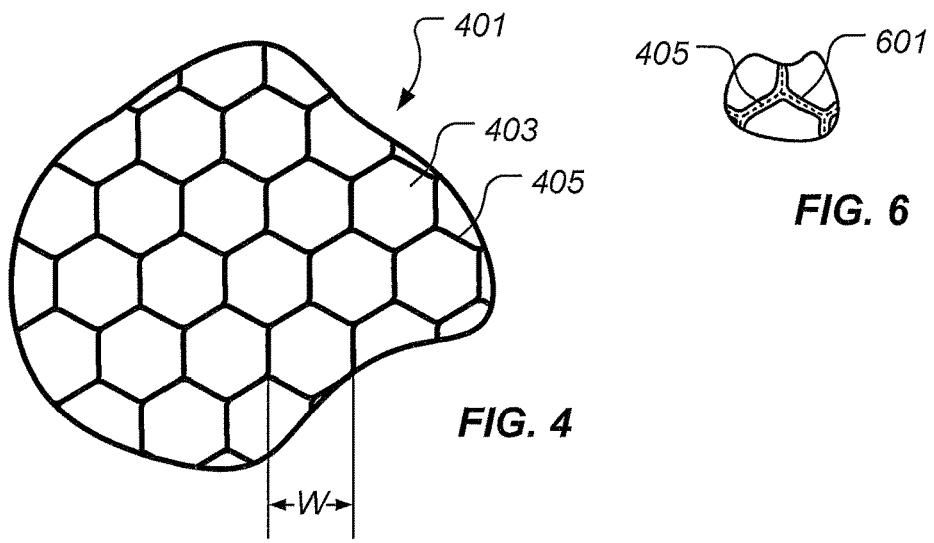
*FIG. 4*
*FIG. 6*
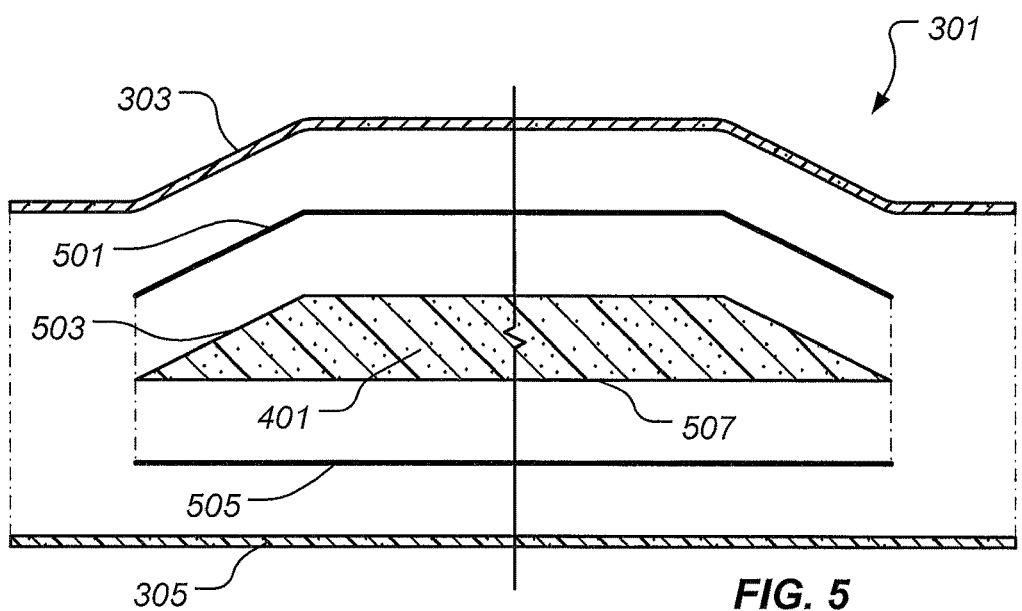
*FIG. 5*

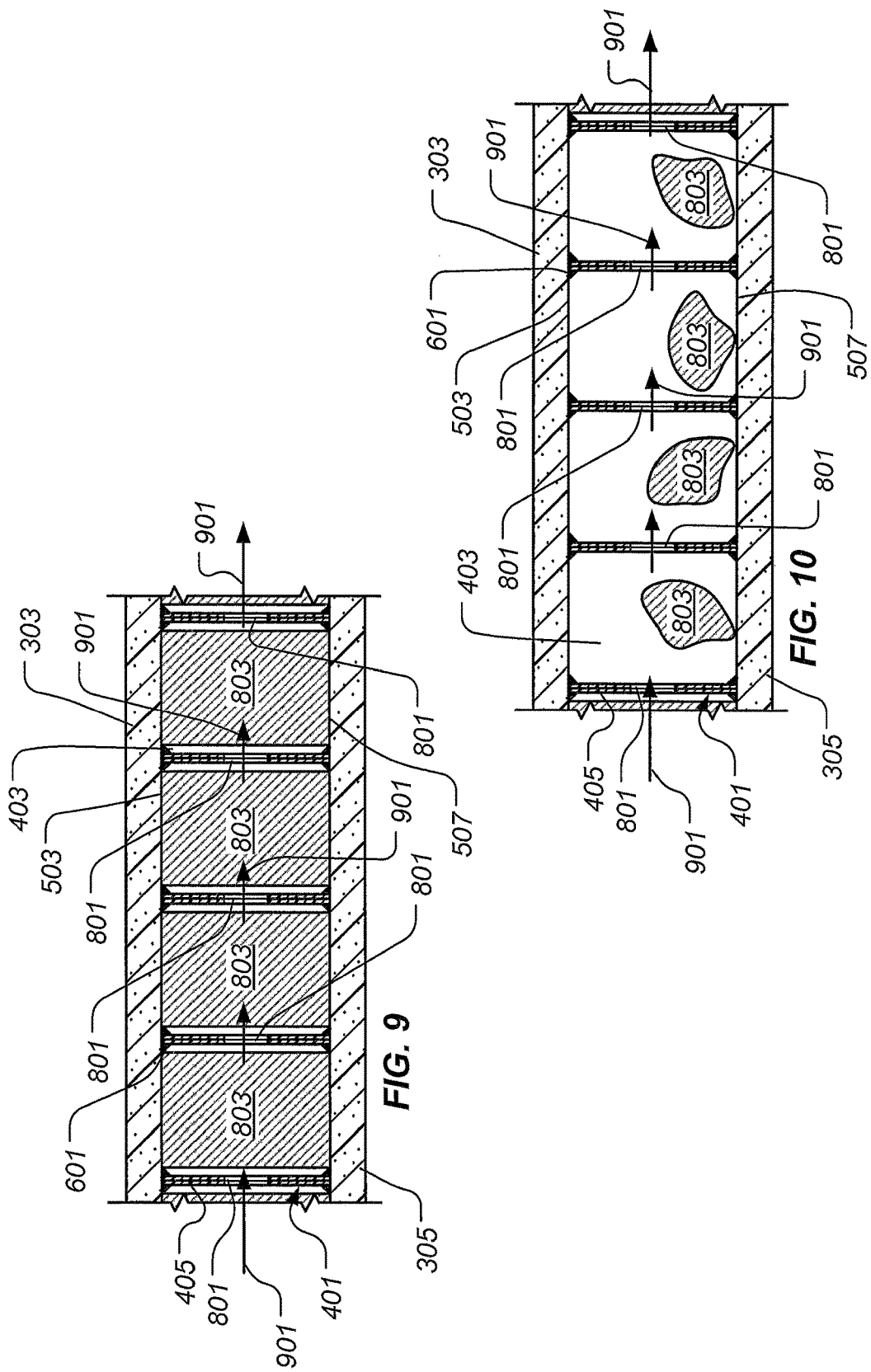

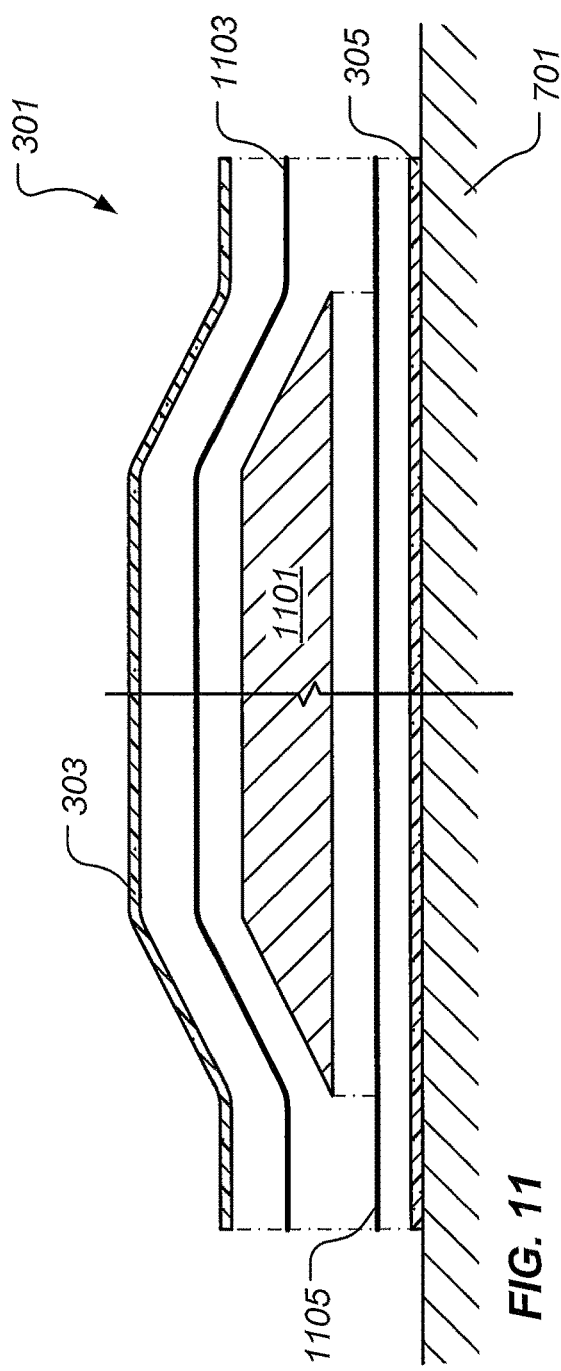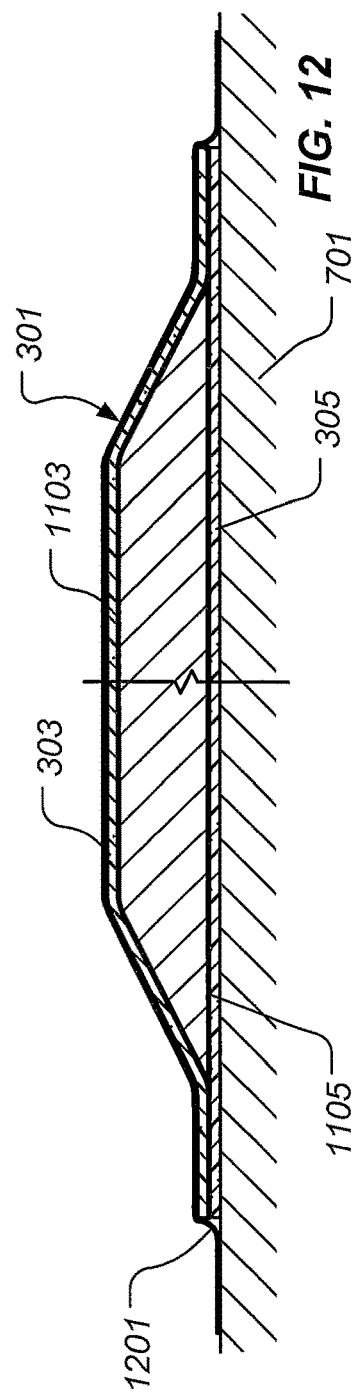

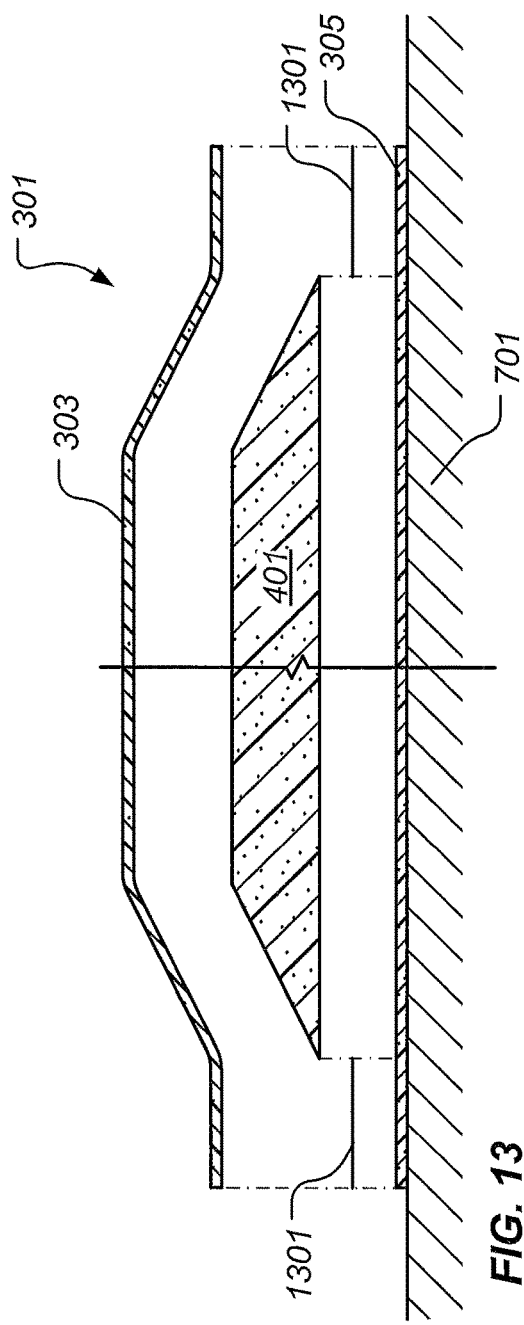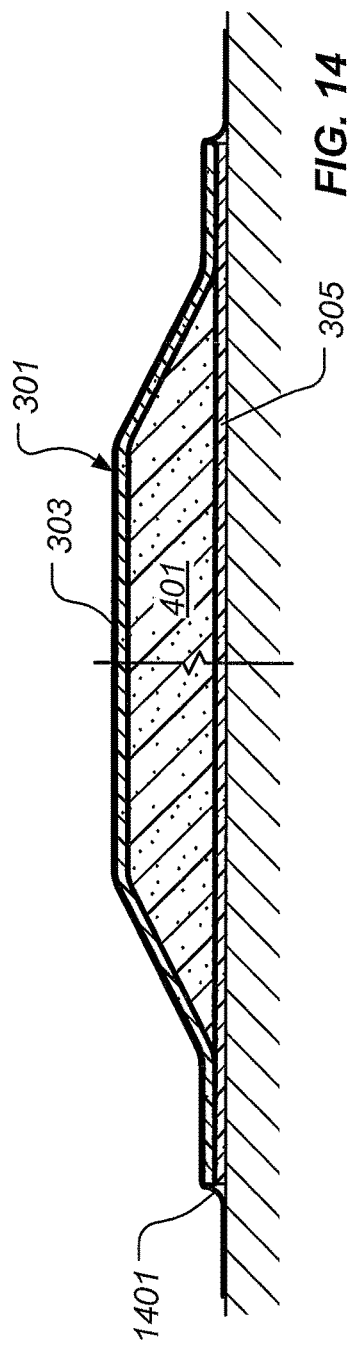

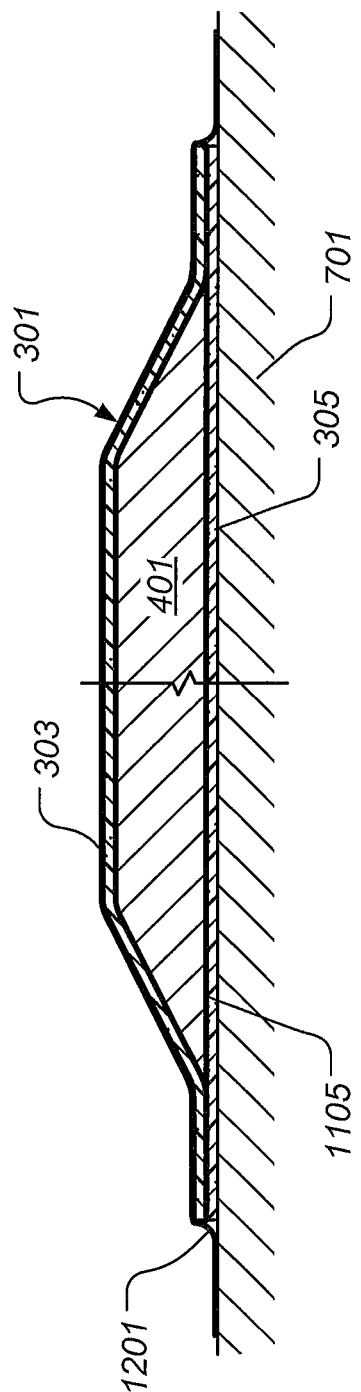

METHOD OF MAKING CORE-STIFFENED STRUCTURE

BACKGROUND

1. Field of the Invention

The present application relates in general to the field of core-stiffened structures.

2. Description of Related Art

Composite structures often comprise honeycomb core disposed between and adhesively bonded to an inner skin and an outer skin. One example of such honeycomb core is a honeycomb core 101, shown in FIG. 1. Generally, honeycomb core 101 includes a plurality of cells 103 (only one labeled for clarity) defined by cell walls 105 (only one labeled for clarity). Each of the plurality of cells 103 exhibits a width W. Typically, the plurality of cells 103 have substantially the same width W but, in some implementations, some cells 103 of the plurality of cells 103 may have different widths W than other cells 103 of the plurality of cells 103.

Traditionally, core-stiffened structures have been limited to the use of honeycomb core 101 having cell widths W of less than about 6 mm. At larger widths W, as shown in FIG. 2, cell walls 105 fail to provide sufficient support for inner skin 201 and outer skin 203 during "curing" of the core-stiffened part, which entails heating the assembled core-stiffened part under pressure. As a result, portions of inner skin 201 and portions of outer skin 203 undesirably extend into cells 103 of honeycomb core 101. Thus, while core-stiffened structures made from larger-celled honeycomb core 101 weigh less than similar structures made from small-celled honeycomb core 101, the manufacture of large-celled composite structures has been limited.

Traditionally, core-stiffened composite structure has been sealed from intrusion of moisture. Some typical core materials are subject to moisture absorption or corrosion resulting from trapped moisture within the core. The sealing, of the core edges is done by ramping one skin along a bevel in the core until both skins contact each other and complete a seal around the periphery of the core. During the cure cycle, the pressure on the ramp surface of the core may push the core in a direction lateral to the tool. In order to prevent such a distortion of the core, typically material is added to the skin in the proximity of the ramp in order to stabilize the skins from lateral distortion of the core during the cure cycle. As such, the skin is thicker than the structural application requires so as to prevent lateral distortion of the core during the cure cycle.

A similar situation exists for core stiffened composite structure where one skin is not parallel to the other skin. Such a scenario includes the risk of the core material being pushed laterally along the tool surface. In order to prevent such a distortion of the core material, additional material is added to the core material and/or to the skins in order to resist the lateral force, and therefore resist core distortion.

There are many methods for processing honeycomb core composite structures well known in the art; however, considerable room for improvement remains.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 3 is a stylized, side, elevational view of a core-stiffened structure according to the present application;

FIG. 4 is a stylized, cross-sectional view of a portion of honeycomb core used in the core-stiffened structure of FIG. 3, taken along the line 4-4 in FIG. 3;

FIG. 5, is a stylized, exploded, cross-sectional view of a first embodiment of the core-stiffened structure of FIG. 3;

FIG. 6 is a stylized, plan view of a portion of the honeycomb core of FIG. 4 with adhesive applied to a surface thereof;

FIGS. 8-10 are stylized, cross-sectional views of the core-stiffened structure of FIG. 3 depicting a second illustrative embodiment of a method for making a core-stiffened structure according to the present application;

FIGS. 11-14 are stylized, cross-sectional views of the core-stiffened structure of FIG. 3 depicting a third illustrative embodiment of a method for making a core-stiffened structure according to the present application;

FIG. 18 is a stylized, cross-sectional view of the core-stiffened structure of FIG. 3 depicting another illustrative embodiment of a method for making a core-stiffened structure according to the present application.

Figure 1:
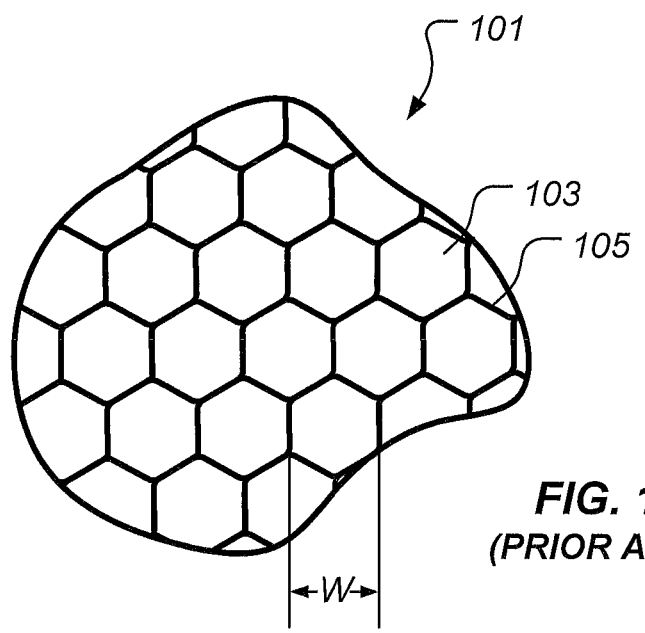
FIG. 1 is a stylized, plan view of a portion of a conventional honeycomb core.
Figure 2:
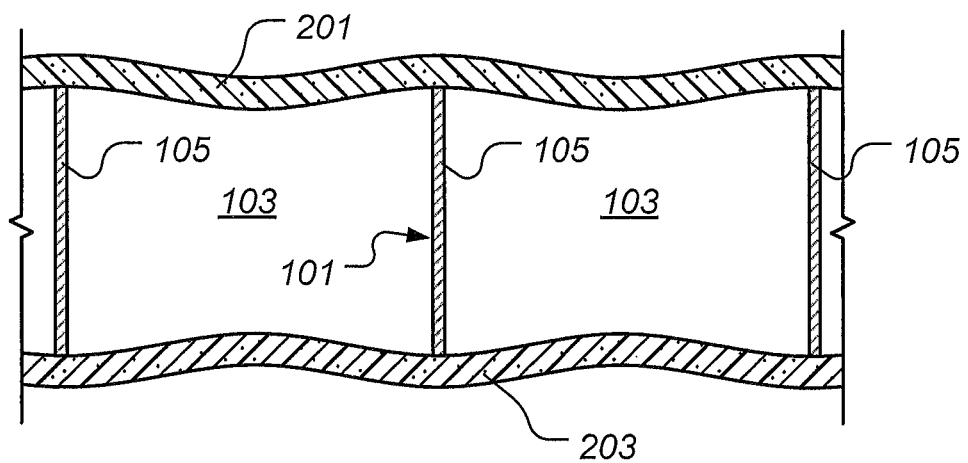
FIG. 2 is a stylized, cross-sectional view of a portion of a conventional, core-stiffened structure utilizing large-celled honeycomb core.

While the application is susceptible to various modifications and alternative forms, specific embodiments thereof have been shown by way of example in the drawings and are herein described in detail. It should be understood, however, that the description herein of specific embodiments is not intended to limit the application to the particular forms disclosed, but on the contrary, the application is to cover all modifications, equivalents, and alternatives falling within the spirit and scope of the application as defined by the appended claims.

DETAILED DESCRIPTION OF THE PREFERRED EMBODIMENT

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

There is a need for an improved method for processing a honeycomb core-stiffened structure and the core-stiffened structure thereof. Therefore, it is an object of the present application to provide an improved method for processing a honeycomb core-stiffened structure and a core-stiffened structure thereof.

This and other objects are achieved by providing a method of making a core-stiffened structure. The method includes the steps of providing a honeycomb core having an adhesive disposed on first and second surfaces thereof, providing a first skin and a second skin, and assembling the first skin, the second skin, and the honeycomb core to form the core-stiffened structure. The method further includes the steps of curing the core-stiffened structure and inhibiting at least one of the first skin and the second skin from protruding into at least one cell of the honeycomb core during the step of curing the composite structure.

In another aspect, the present application provides a core-stiffened structure, including a honeycomb core having first and second surfaces, a first stabilization skin adhesively bonded to the first surface of the core, and in some embodiments, a second stabilization skin adhesively bonded to the second surface of the core. The core-stiffened structure further includes a first skin adhesively bonded to the first stabilization skin a second skin adhesively bonded to the first skin and the second stabilization skin, when the second stabilization skin is used.

In yet another aspect of the present application, a core-stiffened structure assembly is provided. The structure assembly includes a honeycomb core having a first surface and a second surface and defining a plurality of cells and passages extending between the plurality of cells and a first skin disposed on the first surface of the honeycomb core. The core-stiffened structure assembly further includes a second skin disposed on the second surface of the honeycomb core and a soluble plug disposed in at least one of the plurality of cells for inhibiting the first skin and the second skin from protruding into the at least one of the plurality of cells during curing of the core-stiffened structure assembly.

In another aspect of the present application, a core-stiffened structure assembly is provided. The core-stiffened structure assembly includes a honeycomb core having a first surface and a second surface and defining a plurality of cells and passages extending between the plurality of cells and a first skin disposed on the first surface of the honeycomb core. The core-stiffened structure assembly further includes a second skin disposed on the second surface of the honeycomb core. Further, a plug that can be dissolved by chemical reaction is disposed in at least one of the plurality of cells for inhibiting at least one of the first skin and the second skin from protruding into the at least one of the plurality of cells during curing of the core-stiffened structure assembly.

In another aspect, the present application provides a core-stiffened structure assembly. The core-stiffened structure assembly includes a honeycomb core having a first surface and a second surface and defining a plurality of cells and passages extending between the plurality of cells and a first skin disposed on the first surface of the honeycomb core. The core-stiffened structure assembly further includes a second skin disposed on the second surface of the honeycomb core and a thermoplastic plug disposed in at least one of the plurality of cells for inhibiting the first skin and the second skin from protruding into the at least one of the plurality of cells during curing of the core-stiffened structure assembly.

In yet another aspect of the present application, a core-stiffened structure assembly is provided. The core-stiffened structure assembly includes a honeycomb core having a first surface and a second surface and defining a plurality of cells and passages extending between the plurality of cells and a first skin disposed on the first surface of the honeycomb core. The core-stiffened structure assembly further includes a second skin disposed on the second surface of the honeycomb core and one of a magnetorheological fluid and a ferrofluid, disposed in at least one of the plurality of cells for inhibiting at least one of the first skin and the second skin from protruding into the at least one of the plurality of cells during curing of the composite assembly.

In another aspect of the present application, a core-stiffened structure assembly is provided. The core-stiffened structure assembly includes a core, or optionally an insert having a geometry corresponding to a honeycomb core, a first skin, and a first release film disposed between the first skin and the insert or core. The core-stiffened structure assembly further includes a second skin and a second release film disposed between the second skin and the insert or core and between the second skin and the first skin.

In another aspect of the present application, a core-stiffened structure assembly is provided. The core-stiffened structure assembly includes honeycomb core having a first surface and a second surface and defining a plurality of cells and a first skin disposed on the first surface of the honeycomb core and a second skin disposed on the second surface. The first and second skin are not sealed together, instead, either the first or second skin terminates at the edge of the honeycomb core. Any moisture can drain or dry out through venting of the edges or through the skin, if the skin is breathable. The skin that terminates at the edge of the honeycomb core is tailored to prevent overloading of the core material near the core termination edge by progressively dropping off plies in the skin before reaching the edge.

The present application provides significant advantages, including: (1) providing a means for utilizing a large-celled honeycomb core in core-stiffened sandwich structures; (2) providing a means for inhibiting face sheets or skins from protruding into cells of a honeycomb core during curing of a core-stiffened sandwich structure; (3) reducing the tendency of lateral movement of honeycomb core during manufacture; and (4) simplifying edge details in some embodiments of the core-stiffened structures.

The present application represents a method of making honeycomb core-stiffened composite structures comprising large-celled honeycomb core. For the purposes of this disclosure, the term "honeycomb core" means a core material comprising a plurality of interconnected cell walls that define a plurality of cells. While many honeycomb core materials define hexagonal cells, the scope of the present application encompasses core materials that define cells of other shapes, such as square, rectangular, and the like. It should be appreciated that honeycomb can be of a variety of materials, including but not limited to, composite materials and metals. Core can be of any shape and can attach to adjacent skins at angles ranging from perpendicular to parallel. Moreover, the term "large-celled honeycomb core" means, for the purposes of this disclosure, honeycomb core defining cells having a width dimension of more than about 6 mm.

FIG. 3 depicts an illustrative embodiment of one particular core-stiffened structure 301 according to the present application. Core-stiffened structure 301 comprises an inner skin 303, an outer skin 305, and a honeycomb core 401 (shown in FIG. 4) disposed between and adhesively bonded to inner skin 303 and outer skin 305. It should be noted that inner skin 303 and outer skin 305 preferably comprise a plurality of reinforcing fibers disposed in a polymeric matrix. As shown in FIG. 4, honeycomb core 401 comprises a plurality of cells 403 (only one labeled for clarity) defined by a plurality of interconnected cell walls 405 (only one labeled for clarity). The present application is particularly useful when using honeycomb core 401 having cells 403 that exhibit a width W that is greater than about 6 mm.

FIG. 5 depicts a first illustrative embodiment of a method for making core-stiffened structure 301 according to the present application. In the illustrated embodiment, an inner stabilization skin 501 is placed against an inner side 503 of honeycomb core 401 and a lower stabilization skin 505 is placed against an outer side 507 of honeycomb core 401. It should be appreciated that in some embodiments only one stabilization skin may be required. For example, if outer skin 305 is thick enough, then lower stabilization skin 505 is not required to prevent outer skin 305 from deforming into cells 403 of honeycomb core 401. It should be noted that an adhesive (not shown in FIG. 5) is applied to inner surface 503 of honeycomb core 401 and to outer surface 507 of honeycomb core 401. Preferably, the adhesive is applied in a reticulating process, resulting in adhesive 601 substantially covering cell walls 405 at inner surface 503 and outer surface 507 of honeycomb core 401, as shown in FIG. 6. The adhesive, such as adhesive 601, bonds inner stabilization skin 501 and outer stabilization skin 505 to honeycomb core 401.

Referring again to FIG. 5, inner stabilization skin 501 and outer stabilization skin 503 are very thin, such as one or two plies of fiber-reinforced composite material. Stabilization skins 501 and 503 may be perforated, porous, or substantially solid without passages extending therethrough. It should be noted that inner stabilization skin 501 and outer stabilization skin 505 may be substantially fully "cured," i.e., the polymeric matrix is substantially fully cross-linked, if the polymeric matrix comprises a thermosetting polymer, or the polymeric matrix is in a hardened state, if the polymeric matrix comprises a thermoplastic polymer. Alternatively, if the polymeric matrix of inner stabilization skin 501 and outer stabilization skin 505 is a thermosetting polymer, inner stabilization skin 501 and outer stabilization skin 505 may be only cured to an extent such that inner stabilization skin 501 and outer stabilization skin 505 do not substantially deform into cells 403 of honeycomb core 401 during processing. In such an embodiment, adhesive may not be required between inner stabilization skin 501 and inner skin 303, as well as between outer stabilization skin and outer skin 305.

In an embodiment the adhesive is reticulated and the first and second stabilization skins are perforated or porous thereby allows migration of fluid through the first stabilization skin, the second stabilization skin, and the honeycomb core.

Still referring to FIG. 5, outer skin 305 is placed in contact with outer stabilization skin 505 and inner skin 303 is placed in contact with inner stabilization skin 501. In the illustrated embodiment, inner skin 303 contacts outer skin 305 in areas where inner skin 303 does not contact inner stabilization skin 501 and outer skin 305 does not contact outer stabilization skin 505. Adhesive may be used between inner stabilization skin 501 and inner skin 303, as well as between outer stabilization skin 505 and outer skin 305.

Figure 7:
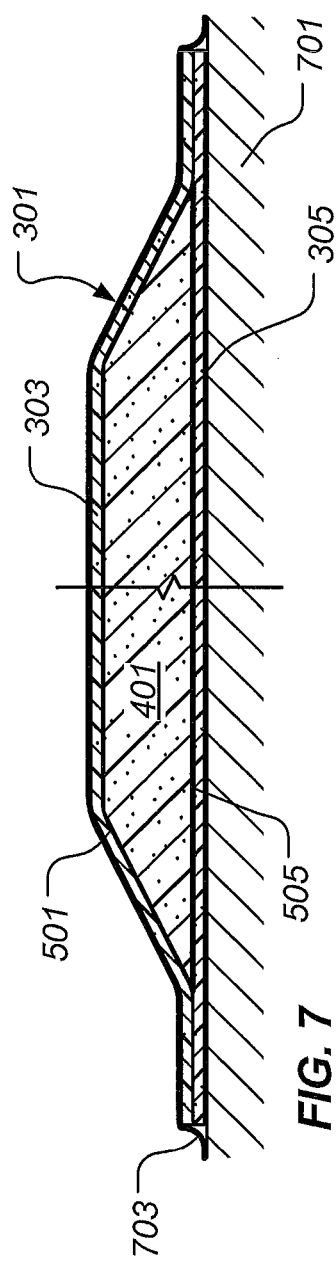
FIG. 7 is a stylized, cross-sectional view of the core-stiffened structure of FIG. 5 in a configuration ready for curing or processing.

It should be noted that, in a preferred embodiment, outer skin 305 is first placed onto a mold or tool 701 (shown in FIG. 7). It should be noted, however, that one or more other plies or layers, such as a breather ply, may be disposed between outer skin 305 and tool 701. Outer stabilization skin 505 is then located on and placed onto outer skin 305. Honeycomb core 401, with adhesive applied to inner surface 503 and outer surface 507 of honeycomb core 401, is then placed onto outer stabilization skin 505, such that outer surface 507 is adjacent outer stabilization skin 505. Inner stabilization skin 501 is then placed onto honeycomb core 401, such that inner surface 501 of honeycomb core 401 is adjacent inner stabilization skin 501. Inner skin 303 is then placed on inner stabilization skin 501, extending onto outer skin 305.

FIG. 7 depicts assembled core-stiffened structure 301 on tool 701. Bagging material 703 extends over core-stiffened structure 301 and onto tool 701. A vacuum is generated between bagging material 703 and tool 701 during processing or curing to consolidate components of core-stiffened structure 301 and to extract gases from core-stiffened structure 301 during processing. Core-stiffened structure 301 is then processed or cured using heat and, preferably, pressure, to form a consolidated core-stiffened structure 301.

While stabilization skins 501 and 505 are depicted as extending only to the edges of honeycomb core 401, the scope of the present application is not so limited. Rather, as inner stabilization skin 501 and/or outer stabilization skin 505 may, in certain embodiments, extend beyond the edges of honeycomb core 401.

Figure 8:
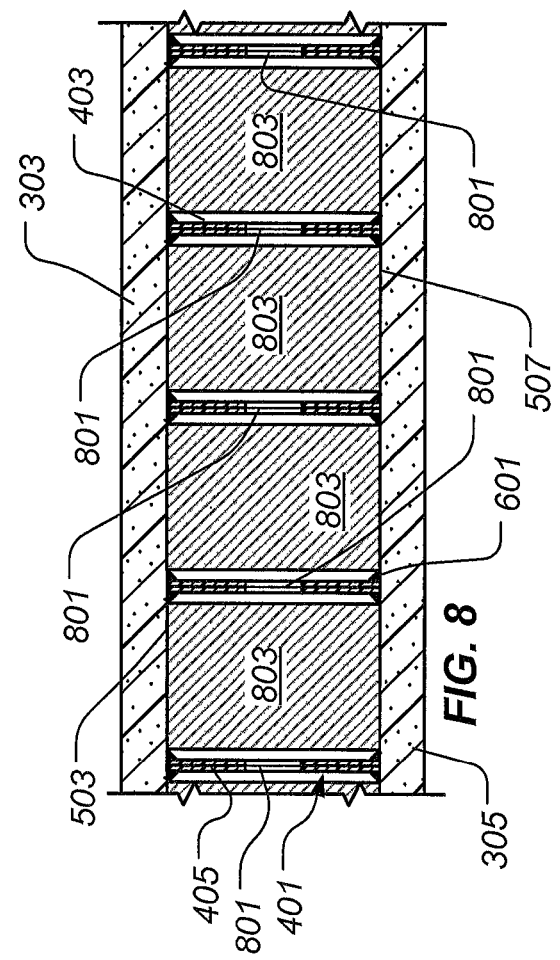

FIGS. 8-10 depict a second illustrative embodiment of a method for making core-stiffened structure 301 according to the present application. In the illustrated embodiment, cell walls 405 of honeycomb core 401 define openings 801 extending between cells 403. Rather than using stabilization skins 501 and 505, a support plug 803 is placed in each of the plurality of cells 403. Adhesive 601 is depicted in reticulated form so as to provide a fillet of adhesive between inner surface 503 and inner skin 303, and between outer surface 507 and outer skin 305. Plugs 803 extend from inner surface 503 to outer surface 507 of honeycomb core 401. Plugs 803 support inner skin 303 and outer skin 305 in areas between cell walls 405, thus inhibiting inner skin 303 and outer skin 305 from protruding into cells 403 during processing or curing. It is preferred that plugs 803 are configured so as to be removable after processing or curing; however, plugs 803 may also be permanent and reside within core 401 during the life of core-stiffened structure 301.

Openings 801 are to introduce fluid flow within core 401. The fluid flow could be gas or liquid. Flow through core 401 can be utilized to introduce heat for manufacturing purposes, to utilize the volume contained in the core to store a liquid such as fuel, or to introduce a washout fluid to dissolve or chemically react to the solid material of plugs 803. Furthermore, flow through core may be used to transfer heat in order to provide ice prevention. In addition, flow through core may be used to transfer heat in order to change heat signature during service of structure 301. Flow through the core may also be used for pressure relief for a gradient, or to build up pressure in the volume within core 401. In an alternative embodiment, openings through at least one of the inner skin 303 or outer skin 305 provide fluid flow, in lieu of or in addition to, openings 801 through core 401.

In one embodiment, plugs 803 comprise a soluble material. In a preferred embodiment, a solvent, such as water, is flushed through honeycomb core 401, as indicated by arrows 901, via openings 801 to erode and remove plugs 803 after core-stiffened structure 301 has been processed or cured, as shown in FIGS. 9 and 10. In such an embodiment, plugs 803 may comprise, for example, a eutectic salt, sodium silicate-bonded sand, polyvinyl alcohol-bonded ceramic microspheres, or the like. Alternatively, plugs 803 may comprise a thermoplastic material that is melted and evacuated from honeycomb core 401 via openings 801. In other embodiments, plugs 803 may comprise a magnetorheological fluid, a ferrofluid, or the like, which become solid or semi-solid in the presence of a magnetic field and which become liquid when the magnetic field is removed. Alternatively, plugs 803 may comprise a clay, such as bentonite, which is removed from honeycomb core 401 via openings 801 by vibrating core-stiffened structure 301. Moreover, plugs 803 may take on the form of a plurality of beads disposed in each of the plurality of cells 403, such that the beads are small enough to pass through openings 801 after core-stiffened structure 301 is processed or cured. Moreover, plugs 803 may be configured to be physically compromised through a chemical reaction, and thus evacuated from core 401 in a solid, liquid, or gaseous state. It is preferred that plugs 803 are configured so as to be removable after processing or curing; however, plugs 803 may also be permanent and reside within core 401 during the life of core-stiffened structure 301.

While plugs 803 are illustrated in FIGS. 8 and 9 as substantially filling cells 403 of honeycomb core 401, the scope of the present application is not so limited. Rather, plugs 803 may not fully extend between cell walls 405, as long as sufficient support is provided to inner skin 303 and outer skin 305 to inhibit inner skin 303 and outer skin 305 from protruding into cells 403 of honeycomb core 401 during processing or curing. For example, plugs 803 may exhibit a plurality of legs extending from a central focal point or line. Preferably, plugs 803 not only exhibit strength to prevent skins from compressing, but also exhibit strength in the lateral direction to prevent lateral deformation of core 401 during processing. Plugs 803 may also exhibit opposing caps supported by an thin axial member such that the caps provide maximum support of inner skin 303 and outer skin 305 while the thin axial member. Preferably, a gap between the caps and the cell walls of core 401 allow space for fillets of adhesive between skins 303 and 305 and core 401.

FIGS. 11-14 depict a third illustrative embodiment of a method for, making core-stiffened structure 301. In the illustrated embodiment, processing or curing of core-stiffened structure 301 is accomplished in two steps. In the first step, an insert 1101 corresponding to the geometry of honeycomb core 401 (best shown in FIG. 13) is placed between inner skin 303 and outer skin 305. An inner release film 1103 is disposed between insert 1101 and inner skin 303 and an outer release film 1105 is disposed between insert 1101 and outer skin 305. Release film 1103 and 1105 comprise, in one embodiment, "peel-ply" material. As shown in FIG. 12, bagging material 1201 is placed over inner skin 303, extending onto tool 701. Inner skin 303 and outer skin 305 are then at least partially cured or processed to achieve at least a semi-rigid state.

Referring now to FIG. 13, inner skin 303 is separated from outer skin 305 and insert 1101 is replaced with honeycomb core 401, having adhesive on inner surface 503 and outer surface 505, as discussed herein. An adhesive layer 1301 is disposed between inner skin 303 and outer skin 305 in areas where inner skin 303 and outer skin 305 abut. FIG. 14 depicts core-stiffened structure 301 assembled and ready for curing or processing, with a bagging material 1401 extending over inner skin 303 and onto tool 701. Core-stiffened structure 301 is then processed, preferably with heat and, in some situations pressure, to adhesively bond inner skin 303 to outer skin 305 and honeycomb core 401 and to adhesively bond outer skin 305 to honeycomb core 401.

Figure 15:
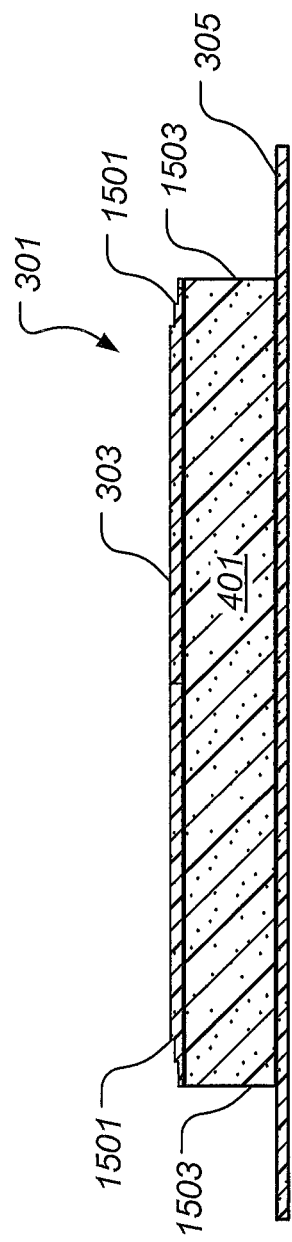
FIG. 15 is a stylized, side, elevational view of a core-stiffened structure according to and alternative embodiment of the present application.

FIG. 15 depicts another illustrative embodiment of one particular core-stiffened structure 301 according to the present application. Core-stiffened structure 301 comprises an inner skin 303, an outer skin 305, and a honeycomb core 401 (shown in FIG. 4) disposed between and adhesively bonded to inner skin 303 and outer skin 305. It should be noted that inner skin 303 and outer skin 305 preferably comprise a plurality of reinforcing fibers disposed in a polymeric matrix. As shown in FIG. 4, honeycomb core 401 comprises a plurality of cells 403 (only one labeled for clarity) defined by a plurality of interconnected cell walls 405 (only one labeled for clarity). Inner skin 303 and outer skin 305 are not sealed together; instead, inner skin 303 terminates at a peripheral edge 1503 of the honeycomb core 401. Any moisture can drain or dry out through peripheral edge 1503 of the honeycomb core 401. If either inner skin 303 or outer skin 305 is breathable, then moisture within honeycomb core 401 can also drain or dry out through breathable skin 303 or 305. Preferably, inner skin 303 does not abruptly terminate at peripheral edge 1503 of the honeycomb core 401; instead inner skin 303 steps down via steps 1501 by progressively dropping off at least one ply in inner skin 303 before reaching peripheral edge 1503. The progressive dropping off in plies of inner skin 303 is tailored to prevent overloading of the honeycomb core 401 near the core peripheral edge 1503. It should be appreciated that the dropping of plies is exemplified in steps 1501 shown in FIG. 15; however, steps 1501 may take on a wide variety of configurations depending upon the thickness of inner skin 1501 as well as the predicted loading of core-stiffened structure 301.

Core-stiffened structure 301 illustrated in FIG. 15 can be manufactured by the methods of manufacture disclosed herein. However, because core 401 is left exposed about peripheral edge 1503, the method of manufacture illustrated in FIGS. 8-10 is particularly well suited for manufacturing the embodiment of core-stiffened structure 301 shown in FIG. 15. The embodiment shown in FIG. 15 is configured to survive in high strain environment while being extremely light due to the lack of ramps between inner skin 303 and outer skin 305.

Figure 16:
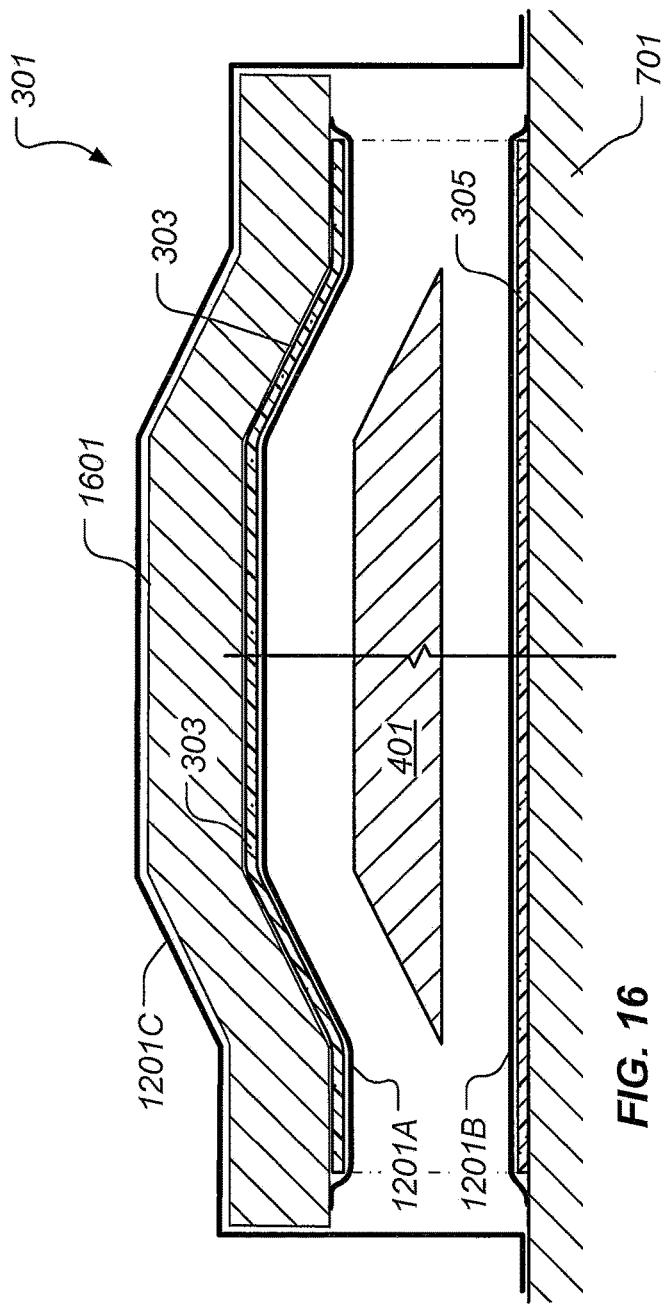
FIGS. 16 and 17 are stylized, cross-sectional views of the core-stiffened structure of FIG. 3 depicting a fourth illustrative embodiment of a method for making a core-stiffened structure according to the present application.
Figure 17:
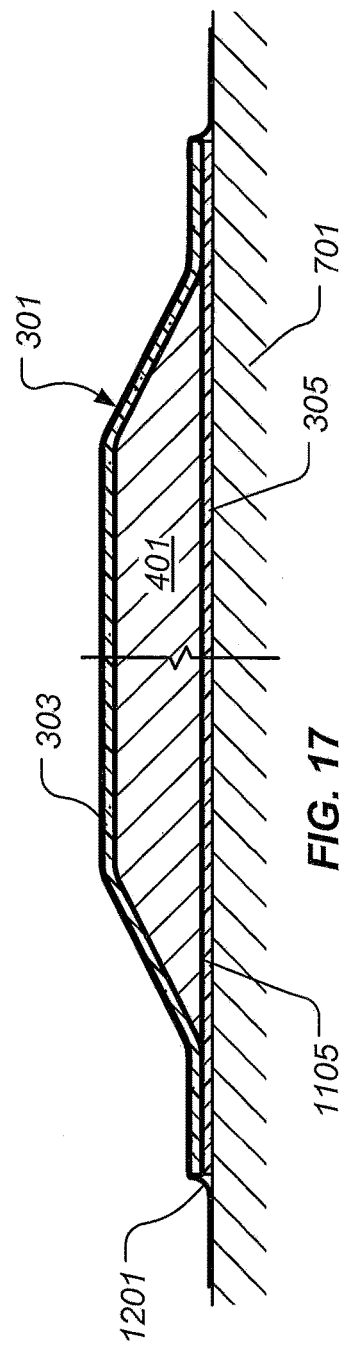

FIGS. 16 and 17 depict another illustrative embodiment method for making core-stiffened structure 301 according to the present application. In the illustrated embodiment, processing or curing of core-stiffened structure 301 is preferably accomplished using out-of-autoclave materials that do not require an autoclave to provide high temperature and pressure. The illustrated embodiment involves two primary steps. In the first step, inner skin 303 is laid against a caul 1601 and sealed thereto with bagging material 1201A. Similarly, outer skin 305 is laid against tool 701 and sealed thereto with bagging material 1201B. Honeycomb core 401 which is to be used in core-stiffened structure 301 is sandwiched between bagging materials 1201A and 1201B. Next, a subsequent bagging material 1201C is placed in sealing contact with tool 701 so as to enclose caul 1601, inner skin 303, core 401, and outer skin 305. In an alternative embodiment, tool 701 is completely enclosed by bagging material 1201. In another alternative embodiment, bagging material 1201C is omitted while pressure from caul 1601 is used to provide pressure between inner skin 303, core 401, and outer skin 305. Inner skin 303 and outer skin 305 are allowed to cure while a separate vacuum is pulled on inner skin 303, outer skin 305, and on the assembly via bagging materials 1201A, 1201B, and 1201C. The vacuum on inner skin 303 and outer skin 305 prevents inner skin 303 and outer skin 305 from sagging and deforming into the cells of core 401. During the curing process, any physical deformations in core 401 are transposed into inner skin 303 and outer skin 305 which provides for improved structural characteristics within core-stiffened structure 301. At this point in the process, core is not bonded to inner skin 301 and outer skin 305 due to lack of adhesive and the barrier provided by bagging material 1201A and 1201B.

The second step involves bonding core 401 to inner skin 303 and outer skin 305. Bagging materials 1201A and 1201B are removed. In addition, adhesive 601 is applied to core 401, preferably through a reticulating process. Adhesive may also be applied directly between inner skin 303 and outer skin 305. During this second step of the process, bagging material 1201 is preferably used to apply pressure to the final curing step for core-stiffened structure 301. However, caul 1601 may be used in lieu of, or in addition to, bagging material 1201. It should be appreciated that the embodiment of core-stiffened structure 301 shown in FIG. 15 may also be manufactured using the method disclosed herein regarding FIGS. 16 and 17.

FIG. 18 depicts another illustrative embodiment method for making core-stiffened structure 301 according to the present application. In the illustrated embodiment, processing or curing of core-stiffened structure 301 is preferably accomplished using out-of-autoclave materials that do not require an autoclave to provide high temperature and pressure. Outer skin 305 is placed against tool 701. Core 401 is placed against outer skin. Adhesive is used to bond inner skin 303 and outer skin 305 to core 401. Cells 403 within core 401 are substantially filled with a plurality of flexible spherical balls, the spherical balls being filled with a gas. Inner skin 303 is placed against core 401. Bagging material 1201 is used to create a vacuum seal between the assembly and tool 701. Core 401, spherical balls, inner skin 303 and outer skin 305 are subjected to vacuum and heat, thereby causing the spherical balls to expand, thereby preventing inner skin 303 and outer skin 305 from sagging into cells 403 of core 401. After curing, temperature and pressure are decreased, thereby causing the volume of the spherical balls to decrease. It is then preferred that the spherical balls are shaken out of core 401 through openings in cell walls of core 401. Spherical balls may also be removed by other means, such as being dissolved by water. In an alternative embodiment, a foam is applied into cells 403 in lieu of the spherical balls. The foam expands, similar to the spherical balls, when exposed to at least one of vacuum and heat in order to prevent inner skin 303 and outer skin 305 from sagging or deforming in core 401 during curing.

While the methods disclosed herein are useful in making composite structures comprising conventional honeycomb core materials, they are particularly useful in making composite structures that include honeycomb core comprising reinforcing fibers disposed in a polymeric matrix.

What is claimed is:

1. A method of making a core-stiffened structure, comprising:
   providing a honeycomb core having an adhesive disposed on first and second surfaces thereof;
   providing a first skin and a second skin;
   assembling the first skin, the second skin, and the honeycomb core to form the core-stiffened structure;
   curing the core-stiffened structure; and
   inhibiting the first skin and the second skin from protruding into at least one cell of the honeycomb core during the step of curing the core-stiffened structure, comprising:
      providing a first stabilization skin in a perforated or porous configuration;
      placing the first stabilization skin between the first skin and the first surface of the honeycomb core prior to performing the step of curing the core-stiffened structure;
      providing a second stabilization skin in a perforated or porous configuration; and
      placing the second stabilization skin between the second skin and the second surface of the honeycomb core prior to performing the step of curing the core-stiffened structure;
      wherein the second stabilization skin inhibits the second skin from protruding into the at least one cell of the honeycomb core; and
      wherein the first stabilization skin inhibits the first skin from protruding into the at least one cell of the honeycomb core;
   wherein the first stabilization skin is substantially fully cured as the core-stiffened structure is assembled;
   wherein the first stabilization skin does not contact the second surface of the honeycomb core;
   wherein the second stabilization skin does not contact the first surface of the honeycomb core;
   wherein the first stabilization skin and the second stabilization skin are secured to the honeycomb core during the step of curing the core-stiffened structure; and
   wherein the adhesive is reticulated and thereby allows migration of fluid through the first stabilization skin, the second stabilization skin, and the honeycomb core.

* * * * *